July 5, 1949.  F. MASSA  2,475,148

TRANSDUCER MEANS

Filed April 16, 1945

Inventor
Frank Massa

Patented July 5, 1949

2,475,148

UNITED STATES PATENT OFFICE 2,475,148

TRANSDUCER MEANS

Frank Massa, Cleveland Heights, Ohio

Application April 16, 1945, Serial No. 588,691

10 Claims. (Cl. 171—327)

My invention is concerned with electro-mechanical transducers of the types in which alternating electric currents may be converted to vibrating mechanical motions and, conversely, in which mechanical vibrations may be converted to alternating electrical voltages. I am primarily concerned in magnetostriction means for designing electro-mechanical transducers.

The magnetostriction effect is the well-known magnetic phenomena in which the application of a magnetic field is accompanied by changes in the dimensions of a body and the reciprocal relations in which the application of a stress causes a change in the magnetic properties of the body. Pure nickel has been well known as a material possessing relatively high magnetostrictive effects, having a change in length of the order of two parts per ten million for each gauss change in density in an average field of 100 gauss. In order to utilize efficiently the magnetostrictive properties of nickel in the audio-frequency range, it would be necessary to employ nickel rods having a length of many inches which generally would be impractical. If the nickel were to be utilized as a vibrator for relatively low-frequency use in which amplitudes of a few thousandths of an inch were required, the length of the rods would have to be several feet, which would make the design very impractical.

The purpose of this invention is to provide a means for efficiently employing the magnetostrictive properties of materials in the low and mid-audio-frequency range. The basic principle of my invention is to combine two magnetostriction materials in a manner similar to the technique employed in the fabrication of a thermostatic bi-metallic strip. The choice of materials in the fabrication of my bi-metallic magnetostriction elements is such that one material expands with the increase in the magnetic field strength while the second material contracts during the increase in magnetic field. When such is the case, it can be readily seen that small changes in the increase and decrease in the lengths of the bonded strips will cause relatively large bending motions near the ends of the assembly.

It is well known that nickel possesses the property of reducing its length when subjected to an increase in magnetic field intensity. Iron-nickel and iron-cobalt alloys for certain compositions have the property of increasing in length during an increase in the magnetic field strength. For flux densities of the order of 100 gauss, nickel-iron alloys having approximately 35 to 50 per cent nickel, and cobalt-iron alloys having approximately 20 to 70 per cent cobalt, have magnetostriction effects that are of the same order of magnitude as pure nickel but opposite in sign. In other words, these alloys will increase in length during an increase in flux density, whereas nickel will decrease in length. When I rigidly attach a ribbon of nickel to a ribbon of iron-nickel or iron-cobalt alloy and subject the assembly to a magnetic field, there will be an increase in the length of the alloy ribbon and a decrease in the length of the nickel, thus causing the bi-metallic strip to form a curve giving amplified transverse amplitudes as compared with the amplitude changes along the axes of the individual strips. If I cause the magnetic field to oscillate, the bi-metallic strip will vibrate transversely at one end if the other end is fixed. The frequency of vibration of the strip will be at twice the frequency of the alternating flux if no D.-C. polarizing flux is impressed on the element. If a D.-C. flux is used upon which an A.-C. flux is super-imposed, the frequency of vibration will correspond to the frequency of the alternating flux.

As the ribbons of metal are made thinner and longer, the amplitude of the transverse vibrations will increase. As this is accomplished, there will be corresponding lowering of the resonant frequency of the bi-metallic assembly. For cases where a vibrating contactor is desired, I may design the element to have a natural period at the required frequency of operation, in which case I shall be able to produce relatively large amplitudes at the vibrating contact tips.

A large field of application of my new magnetostriction bi-metallic element is in electro-mechanical and electro-acoustic devices such as vibrators, microphones, phonograph pickups, record cutters, oscillograph elements, loud speakers, head phones, and other similar equipment. A few such applications will be described in these specifications.

An object of my invention is to produce a magnetostrictively active bi-metallic strip in which one portion of the bi-metallic element has a positive magnetostrictive coefficient, whereas the other portion of the assembly has a negative magnetostriction coefficient.

Another object of my invention is to amplify greatly the available motion which can be obtained from a single piece of magnetostriction material.

Still another object of my invention is to lower the resonant frequency of a magnetostriction element to a value much lower than would be realized by employing a single magnetostriction material in the construction of the element.

A further object of my invention is to produce an economical design of an electro-mechanical vibrator which needs no magnets or contact interruptors.

Still another object of my invention is to produce electro-acoustic transducer elements that are very cheap and extremely rugged.

Another object of my invention is to increase greatly the efficiency of magnetostriction devices in the low and mid audio-frequency regions.

The novel features that I consider characteristic of my invention are set forth with particularity in the appended claims. The invention, itself, however, both as to its organization and method of operation, as well as additional objects and advantages thereof, will best be understood from the following description of several embodiments thereof, when read in connection with the accompanying drawings, in which—

Figure 1:
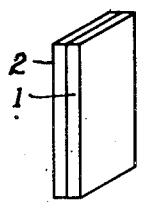
Fig. 1 is a representation of one form of my invention in which two rectangular strips of magnetostrictive materials having positive and negative magnetostriction coefficients are rigidly bonded to form a bi-metallic assembly.

Referring more particularly to Fig. 1, 1 is a thin strip of magnetostriction material having a negative magnetostriction coefficient such as nickel. A second strip of magnetostriction material 2 having a positive magnetostriction coefficient such as iron-nickel or iron-cobalt alloy is rigidly attached face to face with strip 1. The bond may be made by soldering or any other well-known means of making a rigid joint, and the joint may be only at the edges of the plates or it may extend over the whole area of the faces which are connected together.

Figure 2:
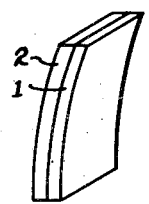
Fig. 2 shows the motion produced in the assembly of Fig. 1 when a magnetic field is impressed on the assembly.

When the bi-metallic assembly of Fig. 1 is subjected to a magnetic field, the length of the nickel strip 1 will be shortened because of the negative characteristic of nickel and the length of strip 2 will be increased because of the positive coefficient of the material 2. As a result of these conditions, the strip will deform as indicated in Fig. 2. The amplitude of the transverse vibration of the bi-metallic strip will be very much greater than the incremental changes in the lengths of the individual component strips 1 and 2.

Figure 3:
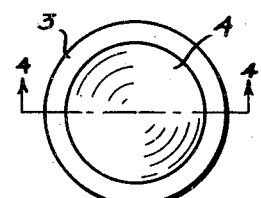
Fig. 3 is a plan view of another form of embodiment of my bi-metallic magnetostriction assembly to produce a circular diaphragm.
Figure 4:
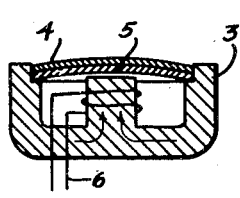
Fig. 4 is a section taken along the line 4—4 of Fig. 3 and indicates how a radial magnetic field is set up in the bi-metallic magnetostriction disc to cause one portion of the disc to increase in diameter and the other portion to decrease in diameter.

In Figs. 3 and 4 is shown a bi-metallic magnetostriction element in the form of a circular disc. The thin sheet 5 is a material like nickel having a negative magnetostriction coefficient, and the sheet 4 is a material of positive magnetostriction coefficient such as iron-cobalt or iron-nickel alloy. The bi-metallic assembly is pre-formed as indicated in Fig. 4. A D.-C. polarizing current is sent through the coil 6 to establish the optimum D.-C. flux density radially through the disc assembly. When A.-C. is super-imposed on the coil 6, the diaphragm will oscillate corresponding to the A.-C. current wave through the coil. Instead of supplying D.-C. through the coil for the polarizing flux, a permanent magnet could be used as a portion of the center pole piece about which the coil 6 is wound. It is desirable to make the center portions of the discs somewhat thicker than the outer edges so that the flux density throughout the sheets will be approximately uniform. This will minimize any non-linear distortion that may otherwise be introduced. The construction shown in Figs. 3 and 4 would be suitable for a head phone, a hearing aid receiver, or for a driver for a horn loud speaker. Likewise, the structure would make a suitable microphone in which sound pressure falling on the diaphragm would cause stresses to be set up in the two materials such that flux changes would result through the coil 6 giving rise to induced voltages corresponding to the undulations in the sound pressure wave.

Figure 5:
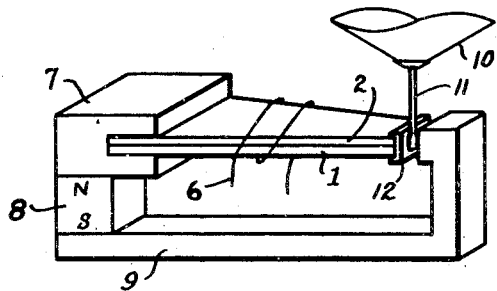
Fig. 5 shows a schematic arrangement for a microphone or loud speaker construction employing the bi-metallic magnetostriction element described in this invention.

Fig. 5 shows a schematic construction for an electro-acoustic transducer such as a loud speaker or microphone. The magnetostriction strips 1 and 2 are the same as described in Fig. 1 and the bi-metallic assembly is anchored rigidly at one end by the base piece 7. A permanent magnet 8 and soft iron yoke 9 form the remainder of the magnetic circuit which serves to send the desired D.-C. flux through the bi-metallic strip. Although it is not essential to the operation of the device, I prefer to assemble the bi-metallic strip in the form of a curve such that the element is made straight by the changes in lengths of the strips 1 and 2 during the establishment of the D.-C. polarizing flux through the element.

A diaphragm 10 is attached through a pin 11 to a clamp 12 which is secured to the free end of the magnetostriction bi-metallic element, as indicated. When alternating currents are caused to flow through the coil 6 vibrations of the free end of the bi-metallic assembly will take place, giving rise to corresponding vibrations of the diaphragm 10, which may be used as a loud speaker. If, instead of supplying A.-C. current to the coil 6 a sound pressure is allowed to actuate the diaphragm 10, then alternating voltages will be induced in the coil 6 by virtue of the flux changes produced through the bi-metallic element because of the changes in stresses in the magnetostriction components 1 and 2 caused by the deflections at the free end of the element.

Figure 6:
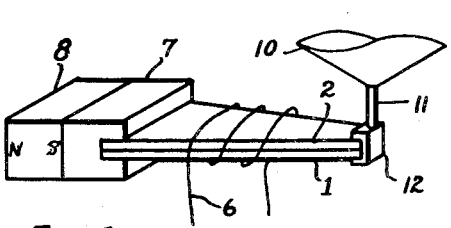
Fig. 6 shows an additional simplification of the construction shown in Fig. 5 in that the magnetic return path is eliminated in the design.

Fig. 6 shows the same assembly as Fig. 5 in which all parts have numbers corresponding to the same parts in Fig. 5. The only difference in Fig. 6 is that the soft iron magnetic yoke has been eliminated and the air is used to complete the magnetic path. This may be done without great harm because of the very low flux densities that are required for the operation of the magnetostriction units. Optimum flux densities in the air gap are generally very much lower than 1000 gauss and may actually be only of the order of 100 gauss. By employing air as the return path, more lines will return into the magnetostriction element nearest the end clamped to part 7 with a minimum number of lines entering at the free end of the element. In order to keep the flux density through the bi-metallic element more nearly uniform, I prefer to taper the thin strips into the trapezoidal shape, as indicated.

Figure 7:
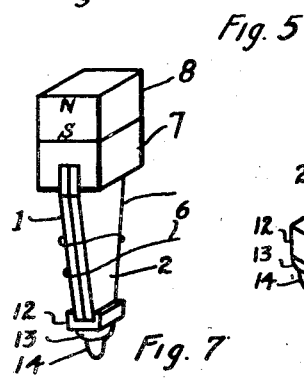
Fig. 7 shows a schematic construction for a phonograph pickup or record cutter for use with lateral recording and employing the bi-metallic element.

Fig. 7 shows the essential components that are employed in the construction of a phonograph pickup or record cutter for use with lateral recordings. All parts which have been described in previous figures have the same numbers. To the clamp 12 which is rigidly attached to the free end of the bi-metallic element, is secured a base piece 13 into which is secured the stylus 14. The entire assembly is carried by an arm not shown, and the dimensions of the strips 1 and 2 are chosen so that a low enough compliance results at the stylus tip 14 to avoid excessive record wear. When the stylus tip 14 is vibrated from side to side in Fig. 7, voltages will be induced in the coil 6 corresponding to the undulations in the record grooves. If the structure is to be used for cutting records, voice currents are allowed to flow through the coil 6 and corresponding vibrations will occur at the stylus tip 14. For the cutter use, it is preferable to use a stiffer assembly than in the case of the pickup so that the reaction offered by the recording material will not influence the vibration of the stylus tip 14.

Figure 8:
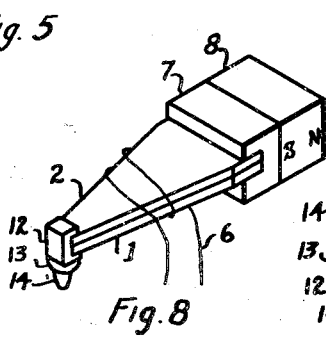
Fig. 8 shows a schematic construction for a phonograph pickup or record cutter for use with "hill and dale" recordings.

Fig. 8 shows another arrangement of the same parts used in Fig. 7 except that the stylus is placed 90° from the position shown in Fig. 7 so that it may be used for "hill and dale" recordings.

Figure 9:
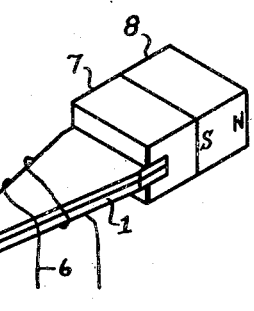
Fig. 9 shows a schematic construction for a pickup or cutter that may be used for either lateral or "hill and dale" recordings.

In Fig. 9 is shown a design of a phonograph pickup in which two styli are attached to the free end of the bi-metallic element. In the position shown in Fig. 9, the pickup is ready to play "hill and dale" recordings. The pickup head is mounted to the pickup arm on a swivel arrangement not shown, so that a simple twist will cause a 90° rotation of the head, bringing the other stylus in a vertical axis and the unit is then ready for playing lateral-cut records.

Figure 10:
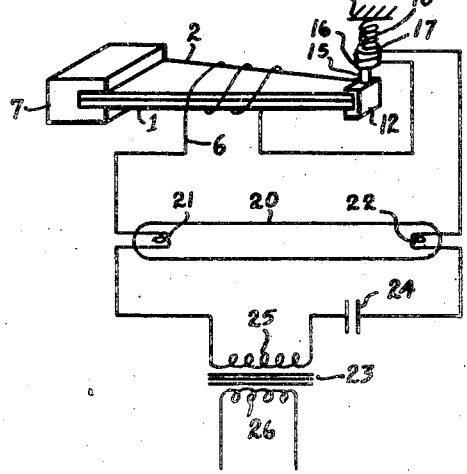
Fig. 10 shows the schematic construction of a vibrator contact switch which operates without D.-C. polarizing flux and works at twice the frequency of the power source. The contactor switch is shown applied in a circuit for use as a starter for fluorescent lights.

Fig. 10 shows the schematic design of a vibrator switch. No polarizing flux is employed in this case and the bi-metallic element is designed to resonate at twice the frequency of the applied voltage. A contact tip 16 is attached through an insulating piece 15 to the chuck 12. A second contact tip 17 is mounted from a fixed point 19 through a light spring 18. In this particular arrangement, it is desired that the contacts be normally closed before the power is turned on. If a normally open contact would be required, the second contact would be spaced by the necessary amount. When A.-C. current is sent through the coil 6 the contact 16 will vibrate at twice the frequency of the supply voltage.

In the particular circuit shown in Fig. 10, the vibrator is employed as a low-cost starting device for a fluorescent lamp. The contact tips 16 and 17 are connected in series with the filaments 21 and 22 in the fluorescent lamp 20 and the filaments, in turn, are connected in series with the secondary 25 of the transformer 23 and the condenser 24. When the power is turned on, the filaments 21 and 22 heat up for a fraction of a second until the vibrator builds up amplitude to eventually break the contacts 16 and 17, causing a high-voltage surge by virtue of the inductance of the coil 6 and the transformer secondary 25 in series with the condenser 24. The high-voltage surge is sufficient to break down the tube 20 between the filaments 21 and 22, thus establishing the operating condition for the lamp. If desired, a glow lamp may be placed in series with the coil 6 to cause it to remain completely disconnected from the circuit while the lamp is on. This has not been shown in Fig. 10 because it is standard practice procedure used in certain fluorescent starting circuits as is well known to those skilled in the art.

Figure 11:
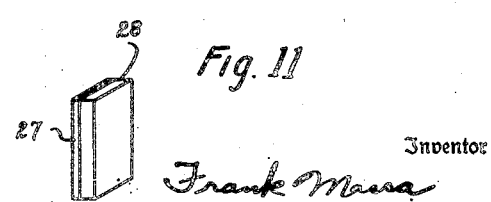
Fig. 11 is a representation of another form of my invention in which two magnetostriction materials of different thicknesses, one having a positive magnetostriction coefficient and the other a negative coefficient, are rigidly bonded together to form a bi-metallic assembly.

Fig. 11 shows an assembly of two magnetostriction materials 27 and 28. Either one of the materials has a negative magnetostriction coefficient and the other has a positive coefficient. Such an assembly of unequal thicknesses could be required for special applications in which unsymmetrical alternating vibrations may be needed or in which non-linearity existing in the vibration of an assembly of two strips of equal thicknesses could be corrected.

Although I have indicated only a few applications for my new bi-metallic magnetostriction transducer element, it will be obvious to those skilled in the art that numerous other applications may be made for the new element, and I, therefore, desire that my invention shall not be limited except insofar as is made necessary by the prior art and by the spirit of the appended claims.

I claim as my invention:

1. A bimetallic magnetostriction element comprising a first portion of substantially uniform thickness composed of a nickel-iron alloy having a positive magnetostriction effect, a second portion of substantially uniform thickness of substantially pure nickel having a negative magnetostriction effect, said portions being bonded together face-to-face, a permanent magnet disposed adjacent the element for providing a D.-C. polarizing flux through the element, and coil means surrounding the element, whereby vibratory bending of the element will vary the flux through said coil and generate an A.-C. voltage therein.

2. The invention set forth in claim 1 characterized in that the magnetostrictive element is in the form of an elongated quadrilateral strip, said strip being initially curved in the direction of its long axis and being substantially straight when subjected to the D.-C. polarizing flux of said permanent magnet.

3. A bimetallic magnetostrictive element comprising an assembly made up of two thin portions of magnetostrictive material bonded together face-to-face, each portion being uniform in thickness and of trapezoidal shape in plan, one portion being composed of an alloy of iron having a positive magnetostrictive effect and the other portion being composed of substantially pure nickel having a negative magnetostrictive effect, and means for clamping one end of the element, the element being adapted to be driven at its free end.

4. A bimetallic magnetostrictive element comprising an assembly made up of two thin portions of magnetostrictive material bonded together face-to-face, one portion being composed of an alloy of iron having a positive magnetostrictive effect, and the other portion being composed of substantially pure nickel having a negative magnetostrictive effect, means for clamping one end of said element, said element being adapted to be driven at its free end, and magnetic polarizing means including said magnetostrictive element in its magnetic circuit.

5. The device set forth in claim 4 characterized in that the portion having a positive magnetostrictive effect is composed of a nickel-iron alloy having a nickel content of approximately 35 to 50 percent.

6. The device set forth in claim 4 characterized in that the portion having a positive magnetostrictive effect is composed of a cobalt-iron alloy having a cobalt content of approximately 20 to 70 percent.

7. The device set forth in claim 4 characterized in that the portion having a positive magnetostrictive effect is composed of a nickel-iron alloy having a nickel content of approximately 35 to 50 percent, there being a pickup coil associated with said magnetostrictive element.

8. The device set forth in claim 4 characterized in that the portion having a positive magnetostrictive effect is composed of a cobalt-iron alloy having a cobalt content of approximately 20 to 70 percent, there being a pickup coil associated with said magnetostrictive element.

9. A bimetallic magnetostrictive element comprising an assembly made up of two thin portions of magnetostrictive material bonded together face-to-face, one portion being composed of a nickel-iron alloy having a nickel content of approximately 35 to 50 percent and having a positive magnetostrictive effect, and the other portion being composed of substantially pure nickel having a negative magnetostrictive effect, means for clamping one end of said element, said element being adapted to be driven at its free end, and a pickup coil associated with said magnetostrictive element.

10. A bimetallic magnetostrictive element comprising an assembly made up of two thin portions of magnetostrictive material bonded together face-to-face, one portion being composed of a cobalt-iron alloy having a cobalt content of approximately 20 to 70 percent and having a positive magnetostrictive effect, and the other portion being composed of substantially pure nickel having a negative magnetostrictive effect, means for clamping one end of said element, said element being adapted to be driven at its free end, and a pickup coil associated with said magnetostrictive element.

FRANK MASSA.

REFERENCES CITED

The following references are of record in the file of this patent:

UNITED STATES PATENTS

| Number | Name | Date |
|---|---|---|
| 548,127 | Moore | Oct. 15, 1895 |
| 1,768,377 | Serduke | June 24, 1930 |
| 1,821,836 | Hull | Sept. 1, 1931 |
| 1,882,394 | Pierce | Oct. 11, 1932 |
| 1,882,398 | Pierce | Oct. 11, 1932 |
| 1,882,399 | Pierce | Oct. 11, 1932 |
| 1,882,400 | Pierce | Oct. 11, 1932 |
| 1,889,153 | Pierce | Nov. 29, 1932 |
| 1,963,075 | Christenson | June 19, 1934 |
| 2,293,795 | Berggren | Aug. 25, 1942 |
| 2,422,817 | Baker | June 24, 1947 |